UNITED STATES PATENT OFFICE.

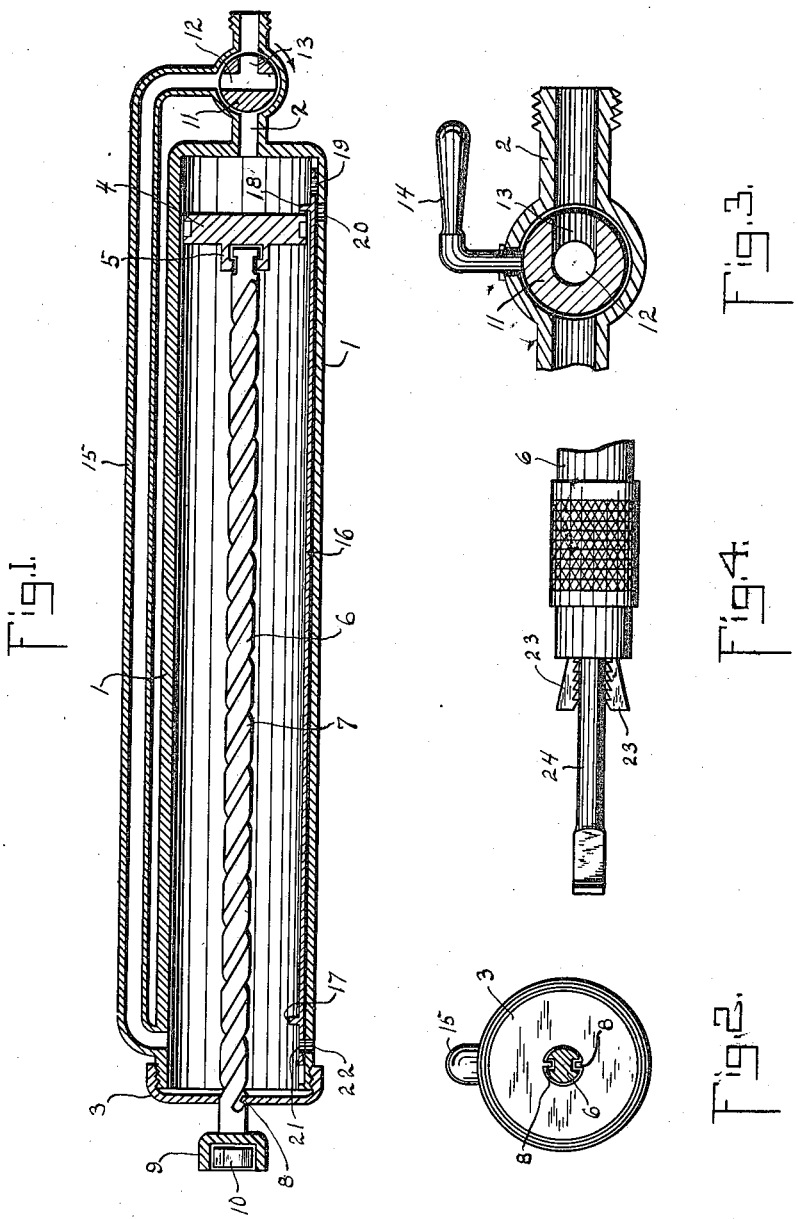

GEORGE T. TAYLOR AND JOHN LESLIE TAYLOR, OF STERLING, ILLINOIS, ASSIGNORS TO ANGIE L. BENNER, OF STERLING, ILLINOIS.

AIR-OPERATED TOOL.

1,173,326.

Specification of Letters Patent.   Patented Feb. 29, 1916.

Application filed February 18, 1915. Serial No. 9,216.

*To all whom it may concern:*

Be it known that we, GEORGE T. TAYLOR and JOHN LESLIE TAYLOR, citizens of the United States, residing at Sterling, in the county of Whiteside and State of Illinois, have invented certain new and useful Improvements in Air-Operated Tools, of which the following is a specification.

Our invention has reference to air-operated tools, and relates more specially to devices for seating or unseating nuts on bolts.

In many shops where machinery is being constructed it is necessary to place large quantities of nuts in position, and this is usually accomplished by operators using hand wrenches, or wrenches located in a brace, and turned by means thereof. This method of operation is not only slow but laborious, on account of the amount of exertion which is required to seat the nut tightly at the end of its movement. In our invention the necessary energy for turning and seating the nut is furnished by the tool itself, relieving the operator entirely therefrom.

While our device is shown and described herein in its preferred form as applied to the operation of a wrench, it can readily be adapted for use as a screw-driver, drill, reamer, or other similar tools.

In the drawings: Figure 1 is a medial longitudinal section of our invention. Fig. 2 is an end view of the cap 3. Fig. 3 is a detail of the valve 11 and pipe 2, in longitudinal section at right angles to the section thereof in Fig. 1. Fig. 4 shows a modified use of shank 5, in detail.

1 represents a cylinder, provided at one end with an inlet pipe 2, and closed at the opposite end by a removable cap 3. Operable in the cylinder 1 is a piston 4, provided on one of its faces with a boxing 5, in which is rotatably held one end of a shank 6, provided with spiral grooves 7. The shank 6 projects outwardly through an opening in the cap 3, provided with projections 8 which engage the channels 7, and cause a rotation of the shank 6 upon a forward or rearward movement thereof. On the outer end the shank 6 is provided with a socket 9, adapted to hold a nut, as represented at 10.

Compressed air is admitted through the pipe 2 from any suitable source, preferably through a flexible pipe which will permit of free movement of the cylinder 1. The admission of such air is controlled by means of a valve 11, provided with a straight passage 12 and an opening 13 at right angles thereto. When the valve is given a quarter turn, in the direction shown by the small arrow in Fig. 1, the passage 12 in the valve is brought into alinement with the opening in the pipe 2, permitting entry of the air to the cylinder 1 in rear of the piston 4. The operation of the valve is accomplished by means of a handle 14 connected therewith. When the valve is given a quarter turn in the opposite direction the opening 13 is brought into line with the pipe 2 and the passage 12 in line with the opening in a pipe 15, which connects at its opposite end with the interior of the cylinder 1 at the forward end thereof.

In the inner wall of the cylinder 1 is a slide-bar 16, provided with inwardly projecting lugs 17 and 18, and having at its rear end an opening 19, adapted to register with a similar opening 20 in the wall of the cylinder. At the opposite end of the bar 16 is an opening 21 capable of registering with a similar opening 22 in the wall of the cylinder. When the air or other fluid under pressure is admitted to the inner end of the cylinder 1 the piston 4 and shank 6 are forced outwardly, causing two or more rotations of the shank and head 9 thereon. As the piston nearly reaches the end of its outer movement it comes in contact with the lug 17, moving the bar 16 until the opening 19 registers with the opening 20, relieving the pressure of air upon the piston. At the same time the opening 22 is closed. The valve 11 is then turned to admit the air to the opposite end of the cylinder through the pipe 15, the air in rear of the cylinder escaping through the port 20. As the piston nears the inner end of its stroke it comes in contact with the lug 18, closing the port 20 and opening the port 22. The valve 11 is then turned again, and the operation continued.

When it is desired to secure a nut on the end of a bolt such nut is partly seated with the hand, then the cylinder held in position to cause the socket 9 to embrace such nut, and the air admitted to the rear of the piston. The forward movement and rotation of the shank 6 instantly completes the turning of the nut, and solidly seats the same. The tool is then disengaged from the nut, and the shank returned to its inner position by reversing the movement of the piston.

Fig. 4 shows the end of the shank 6 equipped with chuck jaws 23, in which is held a screw-driver 24. By operation of the shank 6, as above described, the tool can be employed for driving or removing screws. The screw-driver 24 can be replaced by drills or other tools, or wrenches of varying sizes for use with nuts as hereinbefore set forth can be secured in the jaws 23.

What we claim as our invention, and desire to secure by Letters Patent of the United States, is:

1. A device of the class described, comprising a cylinder; a piston movable therein and provided on one of its faces with a circular boxing; a shank reciprocably mounted in said cylinder, having at its inner end a head rotatably engaged by said boxing and provided with spiral channels; a tool-holding device on the outer end of said shank; and means in the end of said cylinder for engaging the channels in said shank to cause a rotation thereof when the same is reciprocated.

2. A device of the class described, comprising a cylinder; a piston movable therein and provided on one of its faces with a circular boxing; a shank reciprocably mounted in said cylinder, having at its inner end a head rotatably engaged by said boxing and provided with spiral channels; means in the end of said cylinder for engaging the channels in said shank to cause the rotation thereof when the same is reciprocated; means for admitting a fluid supply under pressure alternately to opposite ends of said cylinder; and means for shutting off said supply.

3. A device of the class described, comprising a cylinder; a piston movable therein; a shank rotatably connected with said piston and reciprocable therewith, said shank being provided with spiral channels; means in one end of said cylinder for engaging said spirals to cause a rotation of said shank on the longitudinal movement thereof; means for admitting a supply of fluid under pressure to opposite ends of said cylinder; escape ports in opposite ends of said cylinder and a slide-bar in the inner wall of said cylinder, adapted to be operated by said piston to alternately open and close said ports.

In testimony whereof we affix our signatures in presence of two witnesses.

GEORGE T. TAYLOR.
JOHN LESLIE TAYLOR.

Witnesses:
W. N. HASKELL,
FRANK W. HASKELL.